US010913804B2

(12) United States Patent
Prando et al.

(10) Patent No.: US 10,913,804 B2
(45) Date of Patent: Feb. 9, 2021

(54) **PROCESS FOR SEPARATING NON-*HEVEA* NATURAL RUBBER IN SOLID FORM FROM SOLUTIONS INCLUDING IT**

(71) Applicant: Versalis S.p.A., San Donato Milanese (IT)

(72) Inventors: Tommaso Prando, San Bonifacio (IT); Giovanni Regattieri, Rodigo (IT); Maria Parisi, Ravenna (IT); Dario Ghidoni, Gonzara (IT)

(73) Assignee: Versalis S.P.A., San Donato Milanese (IT)

( * ) Notice: Subject to any disclaimer, the term of this patent is extended or adjusted under 35 U.S.C. 154(b) by 275 days.

(21) Appl. No.: 16/061,948

(22) PCT Filed: Dec. 13, 2016

(86) PCT No.: PCT/IB2016/057573
§ 371 (c)(1),
(2) Date: Jun. 13, 2018

(87) PCT Pub. No.: WO2017/103782
PCT Pub. Date: Jun. 22, 2017

(65) Prior Publication Data
US 2018/0362671 A1    Dec. 20, 2018

(30) Foreign Application Priority Data
Dec. 14, 2015 (IT) ........................ 102015000082623

(51) Int. Cl.
| C08C 1/04 | (2006.01) |
| C08C 1/14 | (2006.01) |
| C08C 2/02 | (2006.01) |
| C08L 7/02 | (2006.01) |
| B01D 11/02 | (2006.01) |

(52) U.S. Cl.
CPC ................. *C08C 1/04* (2013.01); *C08C 1/14* (2013.01); *C08C 2/02* (2013.01); *C08L 7/02* (2013.01); *B01D 11/0288* (2013.01); *C08L 2201/54* (2013.01)

(58) Field of Classification Search
CPC ......... B01D 11/0288; C08C 1/04; C08C 1/14; C08C 2/02; C08C 2201/54
USPC ........................................... 524/575
See application file for complete search history.

(56) References Cited

U.S. PATENT DOCUMENTS

| 4,435,337 A | 3/1984 | Kay et al. |
| 4,739,038 A | 4/1988 | Schloman |
| 9,090,746 B2 | 7/2015 | Martin et al. |
| 2014/0213696 A1* | 7/2014 | Martin ...................... C08C 1/15 523/352 |
| 2014/0288255 A1* | 9/2014 | Martin ...................... C08C 2/02 526/340.4 |

FOREIGN PATENT DOCUMENTS

| EP | 0164137 A2 | 12/1985 |
| WO | WO2013/076700 A1 | 5/2013 |
| WO | WO 2013/134430 A1 | 9/2013 |
| WO | WO2013134430 A1 | 9/2013 |
| WO | WO 2013/192217 A1 | 12/2013 |
| WO | WO2017/103769 A1 | 6/2017 |
| WO | WO2017/103775 A1 | 6/2017 |

OTHER PUBLICATIONS

ASTM-D1278.868 Standard Test Methods for Rubber from Natural Sources—Chemical Analysis, 2011, 6 pages.

* cited by examiner

*Primary Examiner* — Kelechi C Egwim
(74) *Attorney, Agent, or Firm* — Praedcere Law

(57) ABSTRACT

The present invention relates to a process for separating natural rubber deriving from non-*Hevea* type plants, in the form of solid crumbs, from solutions in an organic solvent system including it, where said organic solvent system may comprise at least one nonpolar organic solvent, or a mixture of at least one nonpolar organic solvent and at least one polar organic solvent, and the concomitant removal of said organic solvent system from said rubber, where the aforementioned process comprises subjecting said solution to a stripping stage by means of water vapor, in presence of a dispersing system, separating the aforementioned crumbs of natural rubber from the liquid phase, obtained through the stripping stage, and subjecting said crumbs to drying.

15 Claims, 1 Drawing Sheet

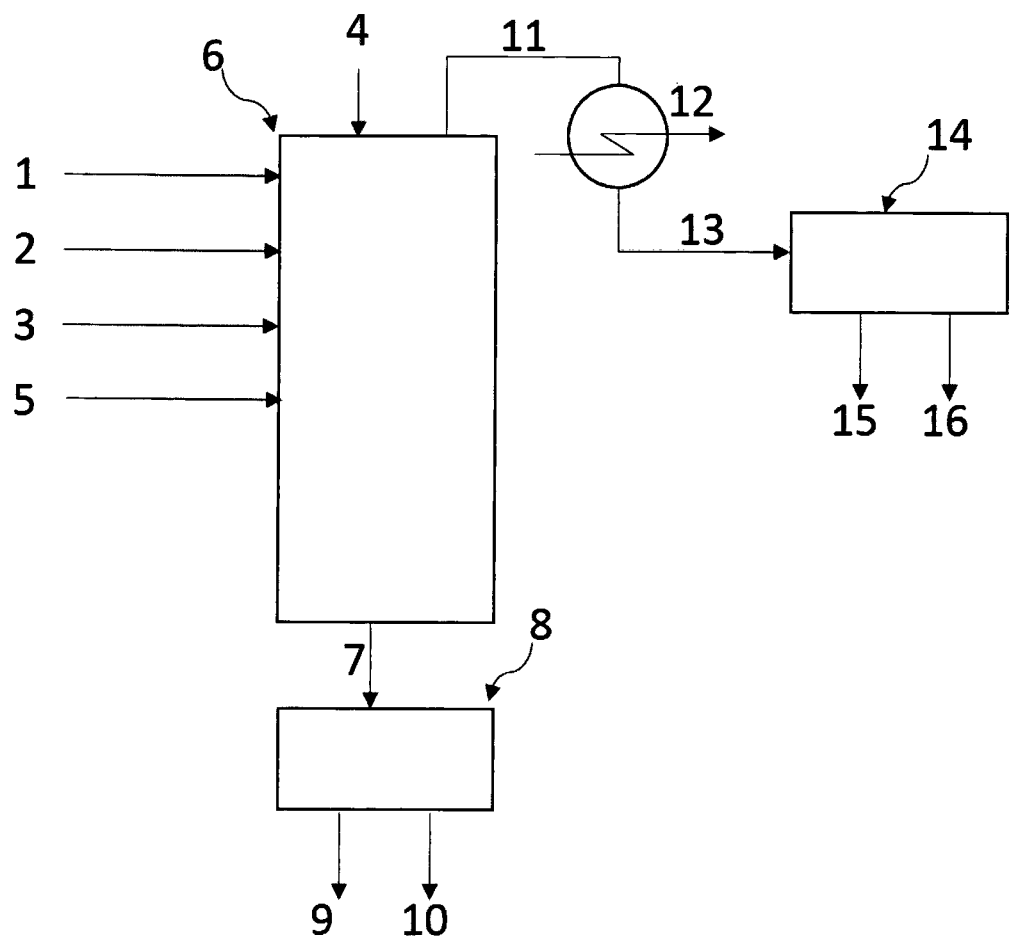

PROCESS FOR SEPARATING NON-*HEVEA* NATURAL RUBBER IN SOLID FORM FROM SOLUTIONS INCLUDING IT

The present invention relates to the industrial sector of extracting and processing natural rubber from plant material.

In particular, the invention relates to a process for separating non-*Hevea* natural rubber in solid form, from solutions in at least one organic solvent including it.

More in particular, the present invention relates to a process for separating natural rubber deriving from non-*Hevea* type plants, in the form of solid crumbs, from solutions in an organic solvent system that include it, wherein said organic solvent system may comprise at least one nonpolar organic solvent, or a mixture of at least one nonpolar organic solvent and at least one polar organic solvent, and the concomitant removal of said organic solvent system from said rubber, wherein the aforementioned process comprises subjecting said solution to a stripping stage by means of water vapor, in presence of a dispersing system, separating the aforementioned crumbs of natural rubber from the liquid phase, obtained through the stripping stage, and subjecting said crumbs to drying. Among non-*Hevea* plants, in particular, said method is advantageously usable for separating guayule natural rubber and/or guayule type rubber from the solutions in organic solvent obtained by applying the extraction methods of natural rubber of the prior art.

Guayule (*Parthenium argentatum*) is a perennial shrub native of the semidesert regions of the South-western U.S.A. (in particular Texas) and Northern Mexico. This plant accumulates natural rubber, mainly comprising the elastomer cis-1,4-polyisoprene, in the form of latex (a milky dispersion or suspension in water) especially in the bark of the branches and of the stem. The natural rubber content can depend on various environmental, farming and storage factors and is therefore comprised between 5 and 20% of the total weight of the dry plant.

The extraction of natural rubber from non-*Hevea* plants such as guayule, as from other plants belonging to the genera of Asteraceae, Euphorbiaceae, Campanulaceae, Labiatae and Moraceae, such as, *Euphorbia lathyris*, *Parthenium incanum*, *Chrysothamnus nauseosus*, *Pedilanthus macrocarpus*, *Cryptostegia grandiflora*, *Asclepias syriaca*, *Asclepias speciosa*, *Asclepias subulata*, *Solidago altissima*, *Solidago graminifolia*, *Solidago rigida*, *Sonchus arvensis*, *Silphium* spp., *Cacalia atriplicifolia*, *Taraxacum koksaghyz*, *Pycnanthemum incanum*, *Teucrium canadense*, *Campanula americana*, represents an important alternative to the extraction of natural rubber from *Hevea brasiliensis*, especially considering the greater resistance of these species to pathogenic agents that attack *Hevea*, the lower import costs of the raw plant material and in virtue of the lower content, in rubber extracted from these plants compared to that derived from *Hevea*, of numerous protein contaminants responsible for type I (or IgE-mediated) latex allergies.

For these reasons, over recent years numerous studies have been conducted for the purpose of developing methods and technologies of extracting natural rubber from non-*Hevea* plants, for example from guayule or guayule type plants.

As is known, the production of natural rubber from guayule is performed by grinding the plant material and isolating the cellular components, comprising the rubber itself, with physical and/or chemical methods.

Processes of the prior art typically envisage a first extraction step of the natural polymer with at least one organic solvent.

Generally, to separate non-*Hevea* rubber from other components contained in plant biomass, a specific extracting agent is added to the natural polymer solution obtained through extraction, which can separate said polymer from its solvent, through the coagulation and then the precipitation of the rubber in solid phase. The extracting agent may be an organic solvent different from the organic solvent used for the extraction of the rubber. Subsequently, the rubber in solid phase is subjected to a removal stage of said extracting agent ("desolventization"). The desolventization stage may be performed with physical and/or chemical methods.

For example, European patent EP 0 164 137 describes a method that envisages the extraction of rubber and resin from guayule plants by means of an organic solvent (e.g. hexane, or the miscella that is obtained from the aforementioned extraction with hexane) able to solubilize both the rubber and the resin. In a second step, a "non-solvent" of the rubber (e.g. acetone) is added to the miscella obtained from the extraction, which causes the precipitation of the latter. The deresinated rubber is then recovered in relatively pure form through washing and reprecipitation. The desolventization is obtained through filtration and/or centrifugation processes, while the quantitative removal of the solvent is obtained through drying.

International patent application WO 2013/134430 describes a process for extracting natural rubber from non-*Hevea* plants, which envisages the grinding of plant material and the extraction in a mixture of polar and nonpolar organic solvents. After the separation of the bagasse, the solution obtained during the extraction stage is treated so as to increase the ratio between polar organic solvent and nonpolar organic solvent (e.g. by adding polar organic solvent or reducing the quantity of nonpolar solvent), so as to cause the coagulation of the rubber having high weight average molecular mass (greater than $1 \cdot 10^6$ g/mol), into particles which are separated by sedimentation and decanting. In the remaining polymeric solution it is possible to further modify the polar organic solvent vs. nonpolar organic solvent ratio (e.g. by adding more polar organic solvent) for promoting the coagulation of higher quantities of rubber, which is separated by sedimentation and decanting. In this way, suspensions ("slurries") of solid rubber particles can be obtained from which the solvent is removed by evaporation through the application of heat (at temperatures comprised between 40 and 100° C.), at atmospheric pressure or under vacuum (up to 10-100 kPa), in order to make the slurry reach temperatures higher than the boiling point of the organic solvent present at the operating pressure.

Also in international patent application WO 2013/192217 a process is described for extracting rubber with a co-solvent mixture containing hexane and acetone, followed by the separation of the solid phase by sedimentation, decanting, centrifugation and filtration. Acetone is added to the clear solution, which causes the coagulation of the rubber. The rubber agglomerates are subjected to different washing cycles through dissolving the natural polymer in hexane and acetone and subsequent coagulation through the addition of acetone. Desolventization is obtained by wringing the rubber agglomerates to remove excess solvent and drying in an oven at 65-70° C. under vacuum, followed by two further cycles of dissolution of the polymer in hexane and recovery of the rubber in the solid phase after evaporation of the solvent under a fumehood.

U.S. Pat. No. 4,435,337 describes a process for extracting rubber with nonpolar organic solvent, followed by the addition of an extracting agent (acetone). In this way the precipitation of the rubber is obtained, which can be subsequently transferred into water for facilitating the washing and separation of the mixture of solvents through floatation.

Finally, US 2014/288,255 describes a process for obtaining natural rubber from non-*Hevea* plants, wherein the natural polymer can be obtained directly as filaments of rubber in water, or through centrifugation or evaporation of rubber emulsions following extraction in appropriate solvents. The desolventization is performed through double screw extruders or thin film evaporators.

However, the known solutions still have margins for improvement.

In fact, in general, for the purpose of attaining non-*Hevea* rubber in solid phase, the processes of the prior art involve the use of extracting agents or precipitants. It becomes clear that for the purpose of the quality of the final product, the addition of an extracting agent to the polymeric solution (e.g. in the form of another organic solvent) represents a contamination factor for the extracted rubber, which must be remedied through one or more subsequent purification stages for removing said agent.

Furthermore, in the case represented above, in which a second organic solvent is added to a solution as an extracting agent, the question arises of having to treat the mixture of solvents obtained for separating again the two solvents and, for the purpose of making the process sustainable from an industrial viewpoint, recycling them at the extraction stage and at the rubber precipitation stage, respectively.

Finally, in relation to the desolventization stage, the methods described in the prior art allow even very low residual concentrations of volatile matter in the final product to be obtained, down to 0.8% by weight with respect to the total weight of the rubber. However, this volatile matter may also comprise a certain quantity of organic solvent, which is not compatible with the use of non-*Hevea* natural rubber for special uses, e.g. for the production of devices for children, sport but particularly for medical use.

In general, the methods for separating rubber from the solvent described in the prior art which comprise stripping operations of the solid phase under vacuum, or centrifugation, may be difficult to apply to the production of non-*Hevea* natural rubber on an industrial scale, both due to scalability problems and due to the negative effects on the quality of the treated rubber (e.g. oxidation, coloring, etc.) when applied to significant product quantities.

On the other hand, methods commonly applied for the desolventization of synthetic rubbers, starting from polymerization mixtures that contain them, cannot always be successfully used.

Typically, polymerization mixtures of synthetic rubbers can contain unpolymerized monomer fractions, traces of organometallic initiators and polymerization additives, easily characterizable, in solution in an organic solvent.

Conversely, elastomeric mixtures of natural origin include, in addition to the polymer (typically comprised of cis-1,4-polyisoprene, as already mentioned) numerous compounds derived from terpene (typical constituents of resin), as well as biological constituents of plant material (e.g. proteins, fats, polysaccharides) and other compounds, which can have a negative effect on the natural polymer separation and purification processes.

For example, as will be described in more detail below (see Comparative example 4), the use of a stripping method with water vapor for separating the rubber of *Hevea brasiliensis* from the extraction solvent did not allow uniformly sized rubber crumbs to be obtained, having a residual organic solvent content within the desired limits.

The Applicant therefore set out to solve the problem of finding a process for separating non-*Hevea* natural rubber in solid form from solutions in at least one organic solvent including it, as well as removing said solvent from said rubber, able to overcome the drawbacks reported above.

The Applicant has now found that it is possible to obtain non-*Hevea* natural rubber in solid form starting from a solution in an organic solvent system that comprises it and, concomitantly, quantitatively remove from said rubber in solid form said organic solvent system, subjecting the aforementioned solution to a stripping stage through water vapor, in presence of a dispersing system in appropriate concentrations.

The process in accordance with the present invention is characterized in that it does not require the use of additional solvents with respect to the solvent used for the extraction of natural rubber, for the purpose of promoting the passage of the rubber itself from the liquid to the solid phase.

In addition, through said process it is possible to obtain non-*Hevea* natural rubber in the form of solid crumbs in suspension ("slurry"), where the organic solvent has substantially been substituted by water, said crumbs having uniform dimensions optimal for the subsequent processing (sieving, extrusion, etc.).

Furthermore, the process is characterized by high efficiency of removing the solvent system in conditions that do not cause the degradation of the natural rubber.

Finally, the process in accordance with the invention is easily scalable and operable in continuous or discontinuous on an industrial scale, therefore allows significant quantities of non-*Hevea* natural rubber to be obtained having very high qualitative characteristics, even suitable to be used for manufacturing medical devices.

Further characteristics and advantages of the present invention will become apparent from the following detailed description and with reference to the appended FIGURE.

In particular, FIG. 1 is a block diagram that represents one embodiment of the process according to the present invention.

It is important to note that said FIGURE is intended to illustrate the general features of the method, the structure and/or the materials used in some embodiments of the invention and to complement the following written description.

This FIGURE is, however, not to scale and may not accurately reflect the precise structural characteristics or performance of a given embodiment and as such should not be interpreted as defining or limiting a range of values or a property of said embodiment.

For the purposes of the present description and following claims, the definitions of the numeric ranges always include the extremes unless specified otherwise.

In the description of the embodiments of the present invention, use of the terms "comprising" and "containing" indicates that the options described, for example relating to the steps of a method or of a process or the components of a product or of a device, are not necessarily exhaustive. It is however important to note that the present application also provides those embodiments in which, in relation to the described options, e.g. regarding the steps of a method or of a process or the components of a product or of a device, the term "comprising" should be interpreted as "which essentially consists of" or "which consists of", even if not explicitly stated.

For the purpose of the present invention, the term "plant material" is taken to mean any form (e.g. the whole plant, parts of the plant, including roots, branches and/or stem, leaves, any bark, plant fragments obtained by chopping, grinding etc. briquettes and pellets obtained by compacting the plant fragments) in which the non-*Hevea* plant is used for the purpose of extracting, by means of chemical and/or physical methods, the resin and other components present in the plant itself.

The term "bagasse" is taken to mean the residual portion of plant material deriving from the non-*Hevea* natural rubber extraction processes. The bagasse may also include some quantities of non-plant material (e.g. loam, sand, etc.) typically associated with the plant roots and derived from the soil in which they have been grown.

For the purpose of the present invention, the term "miscella" is taken to mean a solution, a suspension or an emulsion comprising natural rubber latex and/or resin, water and possible organic solvents in which the extraction process is performed, and which is obtained after separation of the bagasse.

For the purpose of the present invention, the term "volatile matter" refers to compounds other than natural rubber that may be contained within a sample of solidified rubber but which pass into the vapor phase and can be separated from said sample at temperatures of greater than or equal to 100° C. The volatile matter present in a sample of solidified natural rubber may be determined, for example, by the ASTM D1278-91 (1997) standard test, which is known to a person skilled in the art.

For the purpose of achieving the objective of obtaining a non-*Hevea* natural rubber that meets to the quality requirements of the market and of reducing the residual organic solvent content necessary for the use of said rubber in the sector of childcare articles and sports gear but also in the medical field, the Applicant has tested methods already used successfully for the desolventization of synthetic rubbers.

For example, a sample of guayule rubber solution in nonpolar organic solvent was subjected to stripping through water vapor in the conditions described in international patent WO2013/076700, by the same Applicant, and more precisely, using a dispersing system which included 0.15% by weight with respect to the total weight of the polymer, of a surfactant and 0.015% by weight, with respect to the total weight of the polymer, of $CaCl_2$. The experiment is described in comparative example no. 2. This experiment did not lead to a positive result, because the rubber was obtained in the form of crumbs of very variable dimensions, with diameters comprised between 0.1 mm and 1 dm, which could therefore not be pumped through the connection lines of the stripping system and not suitable for the subsequent processing stages.

In a further test, the Applicant repeated the stripping experiment with water vapor of the same rubber solution, using a dispersing system that comprised 0.15% by weight, with respect to the total weight of the polymer, of a lamellar material, and 0.015% by weight, with respect to the total weight of the polymer, of a cationic surfactant, in accordance with the method described in WO2013/076700. The experiment is described in comparative example no. 3.

Again in this case, the experiment was not successful since it led to the formation of viscous lumps, which stuck to the wall of the stripping reactor, non-uniform in size, which were not pumpable through the connection lines of the stripping system and not suitable for the subsequent processing stages.

The Applicant therefore subjected an extract of *Hevea brasiliensis* rubber in a nonpolar organic solvent to the stripping process using water vapor. The experiment is described in comparative example no. 4 in which higher concentrations of the dispersing system components are used and with the aim of showing that the main difficulties encountered could be attributable to the presence of any natural contaminants extracted together with the rubber. Also in this case, confirming the Applicant's hypothesis, at the end of the process lumps were obtained characterized by high viscosity, adhering to the walls of the stripping reactor, and having non-uniform sizes (with diameter comprised between 0.1 mm and 1 dm), which could not be pumped through the connection lines of the stripping system and not suitable for the subsequent processing stages.

Furthermore, specifically, the high concentration of the surfactant comprised in the dispersing system, adopted to amplify the dispersing effect, caused the formation of a persistent foam, such as to make the application of the process not operable for extended periods of time and in large scale equipments.

Despite the negative lesson learned from the experiments performed, the Applicant unexpectedly discovered that a process for separating non-*Hevea* natural rubber from a solution that comprises it, which implies stripping using water vapor in presence of a dispersing system in a specific range of concentrations, was effective for the purpose of obtaining crumbs regular in shape and uniform in size (average diameter of particles less than 10 mm), and characterized by a content of volatile matter less than 0.75%, and in particular by a residual organic solvent content of less than 4000 ppm.

Therefore, the present invention relates to a process for separating non-*Hevea* natural rubber in the form of solid crumbs from a solution in an organic solvent system including it, characterized by:
  a) subjecting said solution to a stripping stage by means of water vapor, in the presence of a dispersing system that includes:
    from 0.5 to 1.0% by weight with respect to the total weight of said rubber of at least one water-soluble surfactant belonging to the family of polycarboxylates;
    from 0.05 to 1.0% by weight with respect to the total weight of said rubber of at least one water-soluble salt of a metal selected from Al, Ca and Mg.
    obtaining said solid crumbs of non-*Hevea* natural rubber in aqueous suspension;
  b) separating said crumbs of non-*Hevea* natural rubber from said aqueous suspension;
  c) subjecting said crumbs of non-*Hevea* natural rubber to drying.

In a preferred aspect of the present invention, said non-*Hevea* natural rubber may derive from guayule and/or guayule type plants.

In a preferred aspect, said non-*Hevea* natural rubber may derive from plants belonging to the genera of the Asteraceae, Euphorbiaceae, Campanulaceae, Labiatae and Moraceae, such as, *Parthenium argentatum, Euphorbia lathyris, Parthenium incanum, Chrysothamnus nauseosus, Pedilanthus macrocarpus, Cryptostegia grandiflora, Asclepias syriaca, Asclepias speciosa, Asclepias subulata, Solidago altissima, Solidago graminifolia, Solidago rigida, Sonchus arvensis, Silphium* spp., *Cacalia atriplicifolia, Taraxacum kok-saghyz, Pycnanthemum incanum, Teucrium canadense, Campanula americana*.

In a preferred aspect of the present invention, said rubber may be present in said solution in an amount comprised between 2% and 50% by weight, more preferably between 5% and 30% by weight, with respect to the total weight of the solution.

In a further preferred aspect, said rubber may be present in said solution in an amount comprised between 5% and 20% by weight, and even more preferably between 7% and 10% by weight, with respect to the total weight of the solution.

In a preferred aspect of the present invention, the aforementioned organic solvent system may comprise at least one nonpolar organic solvent, or a mixture of at least one nonpolar organic solvent with at least one polar organic solvent.

Preferably, said at least one nonpolar organic solvent has a low boiling point.

Preferably, said at least one polar organic solvent has a low boiling point.

For the purposes of the present invention a solvent with a "low boiling point" means one characterized by a boiling point at atmospheric pressure of less than 100° C.

When the aforementioned organic system comprises a mixture of at least one nonpolar organic solvent and at least one polar organic solvent, said polar organic solvent may be present within concentration limits at which the non-*Hevea* natural rubber is maintained in solution, i.e. such as not to cause it to precipitate and therefore to separate from the solution.

In a preferred aspect, said organic solvent system may comprise at least one nonpolar organic solvent selected from alkanes having from 4 to 9 carbon atoms (e.g. pentane, hexane, heptane), cycloalkanes and alkylcycloalkanes having from 5 to 10 carbon atoms (e.g. cyclohexane, cyclopentane), aromatic hydrocarbons having from 6 to 10 carbon atoms (e.g. benzene, toluene, xylene), or mixtures thereof.

In a preferred aspect said at least one nonpolar solvent is hexane.

In a preferred aspect said at least one nonpolar solvent is cyclohexane.

In a preferred aspect, the at least one polar organic solvent may be selected from an alcohol having from 1 to 8 carbon atoms (e.g. ethanol, isopropanol), ethers and esters having from 2 to 8 carbon atoms, cyclic ethers having from 4 to 8 carbon atoms, ketones having from 3 to 8 carbon atoms (e.g. acetone, methyl ethyl ketone), or mixtures thereof.

In a preferred aspect said at least one polar organic solvent is ethanol. In a preferred aspect said at least one polar organic solvent is acetone.

The stripping of the process in accordance with the invention may be performed by feeding said solution comprising the non-*Hevea* natural rubber to a stripping reactor (defined a "stripper") containing water and comprising the dispersing system, into which a current of water vapor is conveyed.

The dispersing system reduces the viscosity and cohesion of the rubber crumbs and in general allows the stabilization of the suspension of said crumbs in water, so as to promote its processability.

For the purposes of the present invention "processability" is taken to mean the set of features (e.g. the pumpability) which allow all the operations subsequent to the stripping stage with water vapor to be performed without any difficulties comprising, for example, the separation of the solid crumbs (e.g. through filtration), the extrusion and drying thereof. The processability is a parameter strictly connected with the average size of the crumbs. For example, a suspension in which the crumbs are non-uniform in size and/or having an average diameter higher than 10 mm, may be difficult to discharge from the stripper, can cause the lines to get blocked and, in the drying stage, may require more time and more heat to reduce the residual solvent content in the larger crumbs. On the other hand, crumbs that are too fine may not be retained by the solid-liquid separation systems and therefore may be dispersed together with waste water. Furthermore, in the final drying step, crumbs that are too small could undergo overheating or be heated too quickly, both potential causes of degradation of the rubber.

In general, the dispersing system affects the correct operation when the whole equipment in which the process is performed is running, also including the steps upstream and downstream of the stripping with water vapor, and influences the consistency of the quality of the natural rubber obtained, its behavior in any formulations or blends and therefore its application properties.

In a preferred aspect of the present invention, the water-soluble surfactant belonging to the family of polycarboxylates may be the sodium salt of the copolymer of maleic anhydride and 2,4,4-trimethyl-1-pentene (CAS 37199-81-8). Said surfactant, characterized by extremely low toxicity, is sold in liquid, water-miscible form, under the name Sopropon® T 36 by Rhone-Poulenc, Geropon® T/36 by Rhodia, or Orotan® 731A ER by Rhom & Haas. Preferably the surfactant is Orotan® 731A ER.

As is known, by definition a salt is considered to be soluble in water when it can form a 0.1 M solution in water at 25° C.

In a preferred aspect of the present invention the aforementioned water-soluble salt may be a chloride. Preferably, said salt is $CaCl_2$.

The stripping is performed by feeding the aforementioned solution comprising non-*Hevea* natural rubber to the reactor containing water and comprising the aforementioned dispersing system, and simultaneously feeding a current of water vapor so that said vapor current comes into contact with said solution. During the operation, part of the water vapor introduced into the system is condensed, hence providing the necessary heat for the evaporation of the solvent system, while a suspension of solid crumbs of rubber in water is formed with a considerably reduced organic solvent content. The removal efficiency of the solvent by the stripping with water vapor is, in fact, particularly high, since the process of solvent removal from the rubber takes place simultaneously to the formation of the aforementioned crumbs.

The process may be performed discontinuously or continuously. In the first case, for each batch a fixed volume of solution comprising the natural polymer is fed to the stripper and subjected to the stripping process and the crumbs of natural rubber that are formed can be kept as a slurry in water, until the unloading from the stripper.

In the continuous configuration, the process can take place in one or more stirred vessels placed in series, into which the solution comprising the natural rubber, the dispersing system in liquid phase and the water vapor that is condensing inside the vessels are fed separately, continuously and with an automatic flow rate controller. The suspension of crumbs of natural rubber is unloaded in a continuous way, by automatic level control.

The aforementioned crumbs of natural rubber may be present in aqueous solution in a range comprised between 0.5% and 50% by volume with respect to the total volume of said aqueous suspension.

Subsequently, the solid crumbs of natural rubber are subjected to a separation stage from the aforementioned aqueous suspension, with any known method.

For that purpose, all the mechanical means known in the state of the art can be used allowing the separation of a solid phase from a liquid phase, such as, sieves, press filters, vacuum filters, screw presses, rotary presses, auger presses, centrifugal decanters, continuous centrifuges, etc. Furthermore, the aforementioned separation can take place through sedimentation or spontaneous or induced floatation, e.g. with flocculants.

In a preferred aspect of the invention, the solid crumbs of natural rubber are separated from the aforementioned aqueous suspension by filtration.

In a further preferred aspect, said filtration may be performed on a vibrating belt, essentially comprising a mesh that retains the solid crumbs, while discharging the water.

At the end of the separation stage, the crumbs of rubber may still be soaked with water (residual moisture 50%) and may therefore be further subjected to a drying stage.

To this end, the means of the prior art can be used for the purpose of removing water and/or a solvent from a product in solid form, e.g. extruders, screw presses, dryers, ovens etc.

In a preferred aspect of the invention, the step of drying of said crumbs of natural rubber may be performed by extrusion.

In a further preferred aspect, the drying stage may be performed in at least two separate extruder systems. The first extruder compresses the rubber crumbs, allowing the water to escape by "wringing", while the second extruder promotes the evaporation of the residual water since, by dissipation of mechanical energy or application of heat, possibly under vacuum conditions, the temperature of the solid phase increases, so allowing, in appropriate degassing zones, the passage of water directly into the vapor form.

In a preferred aspect, the drying step may comprise passing said crumbs into a drying oven at a temperature comprised between 40° C. and 120° C. at a pressure between 100 and 1100 hPa.

With the process according to the present invention it is possible to obtain rubber with a volatile matter content, mainly water, of less than 0.75% by weight, and preferably a volatile matter content greater than or equal to 0.5% and less than 0.75% by weight.

The volatile matter content can be conveniently determined with the standard analytical method ASTM D1278-91 (1977).

Within the aforementioned crumbs, the residual organic solvent content is in total less than 4000 ppm. In a preferred aspect, the residual content of said organic solvents may be less than 4000 ppm and greater than or equal to 50 ppm. More preferably, the residual content of said organic solvents may be comprised between 2000 ppm and 75 ppm.

In a further preferred aspect, the content of said organic solvents may be comprised between 1000 ppm and 100 ppm.

The residual content of organic solvents, comprised in the aforementioned organic solvent system, in the crumbs of natural rubber can be determined through qualitative and quantitative gas chromatography on a fused silica column, using helium as a carrier gas and with a flame ionization detector (FID). To perform the analysis, a sample of rubber, weighed to an accuracy of 0.1 mg, is dissolved in carbon disulfide containing a known quantity of n-octane as internal standard. One μl of the solution obtained is injected into the gas chromatograph. The instrument is calibrated by injecting 1 μl of a solution containing a known quantity of the organic solvent to be detected (accuracy of 0.01 mg) in carbon disulfide containing n-octane as internal standard. The minimum quantity detectable using the described method is 1 ppm.

Hence, the present invention secondly relates to non-*Hevea* natural rubber obtained with the process in accordance with the invention, characterized by a volatile matter content of less than 0.75% and a residual organic solvent content of less than 4000 ppm.

In a preferred aspect, said volatile matter content is greater than or equal to 0.5% and less than 0.75%.

In a preferred aspect, the residual content of said organic solvents may be less than 4000 ppm and greater than or equal to 50 ppm. In a preferred aspect, the content of said organic solvents may be comprised between 2000 ppm and 75 ppm.

In a further preferred aspect, the content of said organic solvents may be comprised between 1000 ppm and 100 ppm.

Likewise, the present invention thirdly relates to the crumbs of non-*Hevea* natural rubber obtained with the process in accordance with the present invention, having dimensions comprised between 0.1 and 10 mm, in which said rubber is characterized by a volatile matter content of less than 0.75% and a residual organic solvent content of less than 4000 ppm.

In a preferred aspect, said volatile matter content is greater than or equal to 0.5% and less than 0.75%.

In a preferred aspect, the residual content of said organic solvents in said crumbs may be less than 4000 ppm and greater than or equal to 50 ppm. In a preferred aspect, the content of said organic solvents may be comprised between 2000 ppm and 75 ppm.

In a further preferred aspect, the content of said organic solvents may be comprised between 1000 ppm and 100 ppm.

In a preferred aspect, the dimensions of said crumbs of non-*Hevea* natural rubber are comprised between 1 and 10 mm. In a further preferred aspect, the dimensions of said crumbs are comprised between 1 and 5 mm.

The natural rubber obtained through the process according to the present invention may be processed for a variety of different commercial uses. The properties of natural rubber from guayule make it particularly suitable for manufacturing natural rubber items and articles with physical properties similar or surpassing those of natural rubber from *Hevea* brasiliensis.

In particular, the reduced residual organic solvent content makes the aforementioned rubber suitable for use in manufacturing childcare articles and sports gear and, above all, for manufacturing devices for medical use.

FIG. 1 depicts an embodiment of the process according to the present invention.

As shown in FIG. 1, water (1) is fed into a stripping reactor, or "stripper" (6) equipped with a mechanical stirrer (not shown in FIG. 1) until about a third of the capacity of said reactor is reached.

Subsequently, the stirring of the reactor (6) is activated and water vapor (2) is fed at a flow rate such as to bring the water temperature to a value less than or equal to 95° C., for the purpose of preventing the premature boiling of the water.

Subsequently, the dispersing system is fed to the reactor (6) through the line (3) and/or, possibly, through a loading hopper (4), comprising, for example, the water-soluble surfactant belonging to the family of polycarboxylates and the water-soluble salt of a metal chosen from Al, Mg and Ca.

Subsequently the solution of non-*Hevea* natural rubber in organic solvent is fed to the reactor (6) through the line (5). At this point, the flow rate of the water vapor (2) is increased, so as to bring the temperature of the water to a value of less than or equal to 98° C.

The vapors produced during mixing in the stripping reactor (6), essentially comprising uncondensed water vapor and the vapors of the solvent, are collected at the head of the reactor and are extracted from the reactor itself through the line (11) equipped with a valve (not represented in FIG. 1) and sent to the condenser (12). The aqueous phase obtained after passing the vapors through the condenser (12), comprising condensed water vapor and condensed solvent (13), is sent to a decanter (14) from which a water current (15) and a solvent current (16) are recovered, which are sent for further treatments (not shown in FIG. 1).

The suspension (slurry) of crumbs of rubber in water, leaves the stripping reactor (7) through a valve (not shown in FIG. 1) and is sent to a filter (8) from where a water current (9) is recovered, which is sent for further treatments (not shown in FIG. 1) and the crumbs of natural rubber (10) which are sent for the drying stage, e.g. through one or more extruders (not shown in FIG. 1).

For the purpose of putting the present invention into practice and illustrating it more clearly, below are some non-limitative examples.

EXAMPLE 1

Stripping Process of a Non-*Hevea* Rubber Solution with Water Vapor in Presence of a Dispersing System, in Accordance with the Invention 17 L of demineralized water were fed into a 40 L stripping reactor, without baffles and equipped with a double propeller mechanical stirrer. Subsequently, the mechanical agitator was started at a speed of 396 rpm and vapor was fed through a line at 8±1 bar at a temperature comprised between 170° C. and 200° C., in order to bring the temperature of the water to 95° C.

Subsequently, 3.44 g of Orotan® 731 A ER (corresponding to 0.69% by weight with respect to the total weight of the rubber) and 0.24 g of solid $CaCl_2 \cdot 2H_2O$ (corresponding to 0.05% by weight with respect to the total weight of the rubber) were fed in sequence. Once the salt had completely dissolved, the flow rate of the water vapor was increased so as to bring the water temperature to 98° C. and the reactor was started to be fed with 0.5 kg of a solution comprising guayule rubber at 8% by weight in cyclohexane, at a flow rate of about 200 g/min.

In concomitance with the feeding and mixing of the rubber solution with the liquid phase contained in the reactor, the formation of small crumbs of rubber in the solid phase was observed, which remain in suspension in said liquid phase, while the vapors produced, comprising uncondensed water vapor and cyclohexane vapors, were discharged through a valve present at the head of the stripping reactor and sent to a condenser.

After feeding the aforementioned solution, a valve was opened at the bottom of the stripping reactor and the suspension of rubber in the solid phase was sent to a filter, for separating a water current, which was sent for water treatment, from the crumbs of natural rubber which were subsequently sent to the drying stage through extrusion.

The crumbs obtained were subjected to analysis for determining the volatile matter content and the residual solvent content. The values obtained were:
 Volatile matter=0.72%
 Residual solvent=3800 ppm.

Under the optical microscope, the crumbs obtained all have a spheroidal appearance and dimensions comprised between 0.1 and 10 mm; it is also worth noting that said crumbs do not have high viscosity, therefore they do not tend to adhere to the wall of the reactor, hence being able to be quantitatively recovered during the unloading step of the reactor itself.

COMPARATIVE EXAMPLE 2

Stripping Process of a Non-*Hevea* Rubber Solution with Water Vapor in Presence of a Dispersing System, not in Accordance with the Invention The test was performed exactly as described in example 1, with the difference that the dispersing system was comprised of 0.15% by weight with respect to the total weight of Orotan® 731 A ER and 0.015% by weight with respect to the total weight of rubber of $CaCl_2 \cdot 2H_2O$.

In this case, at the end of the process, the natural rubber was not dispersible, with large non dividable crumbs, although the walls of the reactor remained clean.

The volatile matter and residual solvent content, due to the non-uniformity of the crumbs, was not measured. The rubber obtained does not have the required processability characteristics.

COMPARATIVE EXAMPLE 3

Stripping Process of a Non-*Hevea* Rubber Solution with Water Vapor in Presence of a Lamellar System, not in Accordance with the Invention The test was performed exactly as described in example 1, with the difference that the dispersing system was comprised of 0.15% by weight with respect to the total weight of the rubber of Dellite® LVF (montmorillonite belonging to the smectite group) and 0.015% by weight with respect to the total weight of the rubber of Arquad® T-50 (tallow trimethylammonium chloride, Akzo Nobel).

In this case, at the end of the process, the natural rubber was non dispersible and produced an extremely viscous material which hindered the correct operation of the agitator and remained stuck to the walls of the reactor.

Also in this case, in fact, the formation of a large single agglomerate prevented the determination of the volatile matter and residual solvent content. The rubber obtained does not have the required processability characteristics.

COMPARATIVE EXAMPLE 4

Stripping Process of a *Hevea brasiliensis* Rubber Solution with Water Vapor in Presence of a Dispersing System, not in Accordance with the Invention The test was performed exactly as described in example 1, with the difference that the dispersing system was used at much higher concentrations (1.3% by weight with respect to the total weight of Orotan® 731 A ER and 1.3% by weight with respect to the total weight of rubber of solid $CaCl_2 \cdot 2H_2O$) and a solution of *Hevea brasiliensis* at 5% by weight in cyclohexane was used.

Also in this case, at the end of the process, the natural rubber was non dispersible, but produced an extremely viscous material which hindered the correct operation of the agitator and remained stuck to the walls of the reactor. In addition, the high concentration of surfactant produced a persistent foam within the reactor, which already in the experiment duration (30 mins) invaded the fluid transport lines, in fact making the process not applicable on an industrial scale.

For this reason, the volatile matter and residual solvent content was not determined.

COMPARATIVE EXAMPLE 5

Stripping Process of a Non-*Hevea* Rubber Solution with Water Vapor in Presence of a Dispersing System, not in Accordance with the Invention The test was performed exactly as described in example 1, with the difference that the dispersing system was used at much higher concentrations (1.3% by weight with respect to the total weight of Orotan® 731 A ER and 1.3% by weight with respect to the total weight of rubber of solid $CaCl_2 \cdot 2H_2O$).

Also under these conditions the surfactant produced a persistent foam within the reactors, which in the experiment duration (30 mins) invaded the fluid transport lines, in fact making the process not applicable on an industrial scale.

In this case at the end of the experiment crumbs were obtained with a spherical appearance and dimensions of less than 10 mm, with a comparable quantity of volatile matter to the values obtained with the process according to the invention; however, it is important to note that when operating the process for prolonged times, the persistent foam would hinder the stripping action by the water vapor and therefore, regardless of the technical management difficulties, would certainly cause the rubber crumbs to get dirty and cause an increase in the volatile matter and residual solvent content.

The invention claimed is:

1. Process for separating non-*Hevea* natural rubber in the form of solid crumbs from a solution in an organic solvent system including it, comprising:
    a) subjecting said solution to a stripping stage by means of water vapor, in the presence of a dispersing system that includes:
        from 0.5 to 1.0% by weight with respect to the total weight of said rubber of at least one water-soluble surfactant belonging to the family of polycarboxylates;
        from 0.05 to 1.0% by weight with respect to the total weight of said rubber of at least one water-soluble salt of a metal selected from Al, Ca and Mg,
    obtaining said solid crumbs of non-*Hevea* natural rubber in aqueous suspension;
    b) separating said crumbs of non-*Hevea* natural rubber from said aqueous suspension;
    c) subjecting said crumbs of non-*Hevea* natural rubber to drying.

2. Process according to claim 1, wherein said non-*Hevea* natural rubber is derived from guayule and/or guayule type plants.

3. Process according to claim 1, wherein said non-*Hevea* natural rubber is present in said solution in an amount between 2% and 50% by weight, with respect to the total weight of the solution.

4. Process according to claim 1, in which said organic solvent system comprises at least one nonpolar organic solvent, or a mixture of at least one nonpolar organic solvent with at least one polar organic solvent.

5. Process according to claim 1, in which said organic solvent system comprises at least one nonpolar organic solvent selected from alkanes having from 4 to 9 carbon atoms, cycloalkanes and alkylcycloalkanes having 5 to 10 carbon atoms, aromatic hydrocarbons having 6 to 10 carbon atoms, or mixtures thereof.

6. Process according to claim 5, wherein said nonpolar organic solvent is hexane.

7. Process according to claim 5, wherein said nonpolar organic solvent is cyclohexane.

8. Process according to claim 1, in which said organic solvent system comprises at least one polar organic solvent selected from an alcohol having from 1 to 8 carbon atoms, ethers and esters having from 2 to 8 atoms carbon, cyclic ethers having from 4 to 8 carbon atoms, ketones having from 3 to 8 carbon atoms, or mixtures thereof.

9. Process according to claim 8, wherein said polar organic solvent is ethanol.

10. Process according to claim 1, wherein the water-soluble surfactant belonging to the family of polycarboxylates is the sodium salt of the copolymer of maleic anhydride and 2,4,4-trimethyl-1-pentene.

11. Process according to claim 1, wherein said water-soluble salt of a metal selected from Al, Ca and Mg is a chloride.

12. Process according to claim 11, wherein said salt is $CaCl_2$).

13. Process according to claim 1, wherein said solid crumbs of natural rubber are separated from said aqueous suspension by filtration.

14. Process according to claim 1, wherein the step of drying of said crumbs of natural rubber is performed by extrusion.

15. Process according to claim 1, wherein the drying step comprises passing said crumbs into a drying oven at a temperature between 40 and 120° C. at a pressure between 100 and 1100 hPa.

* * * * *